US009721025B2

(12) United States Patent
Sankar et al.

(10) Patent No.: US 9,721,025 B2
(45) Date of Patent: Aug. 1, 2017

(54) GENERATING LOGICAL EXPRESSIONS FOR SEARCH QUERIES

(71) Applicant: Facebook, Inc., Menlo Park, CA (US)

(72) Inventors: Sriram Sankar, Palo Alto, CA (US); Ryan Allen Stout, Menlo Park, CA (US); Thomas Jackson, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/606,330

(22) Filed: Jan. 27, 2015

(65) Prior Publication Data

US 2015/0142790 A1 May 21, 2015

Related U.S. Application Data

(63) Continuation of application No. 13/560,901, filed on Jul. 27, 2012, now Pat. No. 8,983,991.

(51) Int. Cl.
| | |
|---|---|
| *G06F 7/00* | (2006.01) |
| *G06F 17/30* | (2006.01) |
| *G06Q 30/02* | (2012.01) |
| *G06Q 50/00* | (2012.01) |
| *H04L 12/58* | (2006.01) |
| *H04L 29/08* | (2006.01) |

(52) U.S. Cl.
CPC .. *G06F 17/30867* (2013.01); *G06F 17/30389* (2013.01); *G06F 17/30967* (2013.01); *G06Q 30/02* (2013.01); *G06Q 50/01* (2013.01); *H04L 51/32* (2013.01); *H04L 67/22* (2013.01)

(58) Field of Classification Search
CPC ...... G06Q 10/02; G06Q 10/025; G06Q 50/14; G06Q 30/0633; G06Q 30/0641; G06F 3/0482
USPC ........................................................ 707/759
See application file for complete search history.

(56) References Cited

U.S. PATENT DOCUMENTS

| | | | | |
|---|---|---|---|---|
| 7,844,588 | B2 * | 11/2010 | Hyder | G06Q 10/00 707/705 |
| 8,001,552 | B1 * | 8/2011 | Chickneas | G06Q 10/0631 707/999.1 |
| 8,572,129 | B1 * | 10/2013 | Lee | G06F 17/30861 707/798 |
| 9,069,862 | B1 * | 6/2015 | Perkowitz | G06F 17/30867 |
| 2005/0234980 | A1 * | 10/2005 | Birkenhauer | G06F 9/4428 |
| 2008/0071739 | A1 * | 3/2008 | Kumar | G06F 17/30864 |
| 2008/0244429 | A1 * | 10/2008 | Stading | G06F 17/30554 715/764 |
| 2009/0327271 | A1 * | 12/2009 | Amitay | G06F 17/30675 |
| 2010/0318551 | A1 * | 12/2010 | Lai | G06F 17/30867 707/765 |

(Continued)

*Primary Examiner* — Binh V Ho
(74) *Attorney, Agent, or Firm* — Baker Botts L.L.P.

(57) ABSTRACT

In one embodiment, a method comprises, by a computer system, receiving a search term, determining a search constraint for a search query, and generating a search query. The search query includes the search term and the search constraint. The search query requires that at least a first number of search results that are returned in response to the search query match both the search term and the search constraint. The search query permits at least a second number of the search results to match only the search term. The computer system provides the search query for a search against a store of data.

18 Claims, 5 Drawing Sheets

(56) References Cited

U.S. PATENT DOCUMENTS

| | | | |
|---|---|---|---|
| 2011/0022602 A1* | 1/2011 | Luo | G06Q 10/10 707/748 |
| 2011/0072000 A1* | 3/2011 | Haas | G06F 17/30643 707/709 |
| 2011/0078151 A1* | 3/2011 | Bilbrey | G06F 3/03545 707/746 |
| 2011/0093506 A1* | 4/2011 | Lunt | G06F 17/30864 707/798 |
| 2011/0196855 A1* | 8/2011 | Wable | G06F 17/30631 707/711 |
| 2011/0264678 A1* | 10/2011 | Mital | G06F 17/30867 707/759 |
| 2011/0295626 A1* | 12/2011 | Chen | G06Q 30/02 705/7.11 |
| 2013/0054631 A1* | 2/2013 | Govani | G06F 17/30867 707/767 |
| 2014/0025671 A1* | 1/2014 | Marlow | G06F 17/30867 707/727 |
| 2014/0040244 A1* | 2/2014 | Rubinstein | G06F 17/30528 707/722 |
| 2015/0254313 A1* | 9/2015 | Perkowitz | G06F 17/30867 707/740 |

* cited by examiner

GENERATING LOGICAL EXPRESSIONS FOR SEARCH QUERIES

PRIORITY

This application is a continuation under 35 U.S.C. §120 of U.S. patent application Ser. No. 13/560,901, filed 27 Jul. 2012.

TECHNICAL FIELD

This disclosure generally relates to a social-networking system.

BACKGROUND

A social-networking system, such as a social-networking website, may enable its users to interact with it and with each other through it. The social-networking system may create and store a record (such as a user profile) associated with the user. The user profile may include demographic information on the user, communication-channel information for the user, and personal interests of the user. The social-networking system may also create and store a record of the user's relationships with other users in the social-networking system (e.g. a social graph), as well as provide social-networking services (e.g. wall-posts, photo-sharing, or instant-messaging) to facilitate social interaction between or among users in the social-networking system.

DESCRIPTION OF EXAMPLE EMBODIMENTS

A social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g. an enterprise, business, or third party application), or a group (e.g. of individuals or entities). A user node corresponding to a user may comprise information provided by the user and information gathered by various systems, including the social-networking system. For example, the user may provide his name, profile picture, city of residence, contact information (e.g. a phone number, an email address), birth date, gender, marital status, family status, employment, education background, preferences, interests, and other demographical information to be included in the user node. Each user node of the social graph may correspond to a web page (typically known as a profile page). For example, in response to a request including a user name, the social-networking system can access a user node corresponding to the user name, and construct a profile page including the name, a profile picture, and other information associated with the user. A concept node may correspond to a concept of the social-networking system. For example, a concept can represent a real-world entity, such as a movie, a song, a sports team, a celebrity, a restaurant, or a place or a location. An administrative user of a concept node corresponding to a concept may create the concept node by providing information of the concept (e.g. by filling out an online form), causing the social-networking system to create a concept node comprising information associated with the concept. For example and without limitation, information associated with a concept can include a name or a title, a description, one or more images (e.g. an image of a cover page of a book), a web site (e.g. a Universal Resource Locator or URL address) or contact information (e.g. a phone number, an email address). Each concept node of the social graph may correspond to a web page. For example, in response to a request including a name, the social-networking system can access a concept node corresponding to the name, and construct a web page including the name and other information associated with the concept. An edge between a pair of nodes may represent a relationship between the pair of nodes. For example, an edge between two user nodes can represent a friendship between two users. For example, the social-networking system may construct a web page (or a structured document) of a concept node (e.g. a restaurant, a celebrity), incorporating one or more selectable buttons (e.g. "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g. the user checks in a restaurant, or the user likes a celebrity). In addition, the degree of separation between any two nodes is defined as the minimum number of hops required to traverse the social graph from one node to the other. A degree of separation between two nodes can be considered a measure of relatedness between the users or the concepts represented by the two nodes in the social graph.

A social-networking system may support a variety of applications and features, such as status updates, photo sharing, on-line calendars and events, instant messaging, and advertising. For example, a user may post a status update to a user's profile page (typically known as a wall post), which may be accessible to other users of the social-networking system (e.g. based on one or more privacy settings selected by the user). For example, the social-networking system may allow users to post photographs and other multimedia files (e.g. video clips) to a user's profile page or in a photo album, both of which may be accessible to other users of the social-networking system (e.g. based on one or more privacy settings selected by the user). A photo (or a media file) may contain metadata (often called "tags") associated with the photo (e.g. time stamp, resolution). A user can also add metadata values to a photo, or tag a photo, during or after uploading the photo to the social-networking system. Some examples of the tags of a photo are author, title, location, or names of people appearing in the photo.

The social-networking system may also allow users to configure events. For example, a first user may configure an event with attributes including time and date of the event, location of the event, and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users. For example, the social-networking system may maintain an address book for a user. An address book may contain one or more contacts (e.g. a person or a business identity) and for each contact, contact information for the contact (e.g. a phone number, a user identifier for an instant messaging or IM service, an email address, a user identifier for a social-networking system, home address, or any suitable unique identifier of any suitable communication channel).

Figure 1:
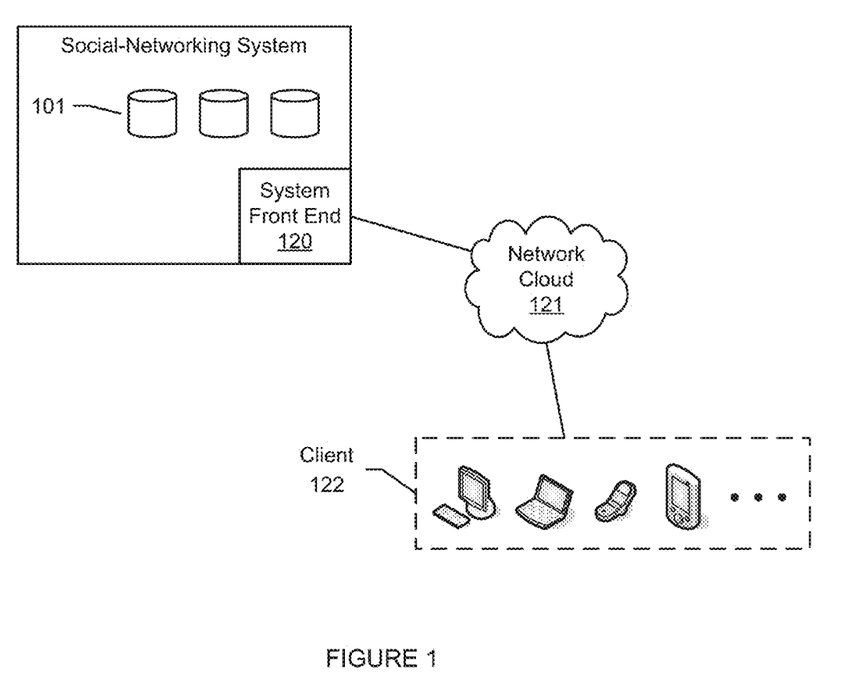
FIG. 1 illustrates an example network environment of a social-networking system.

FIG. 1 illustrates an example network environment of a social-networking system. In particular embodiments, a social-networking system may comprise one or more data stores 101. For example, each data store 101 may comprise one or more storage devices. In particular embodiments, the social-networking system may store in data stores 101 a social graph comprising user nodes, concept nodes, and edges between nodes as described earlier. Each user node may comprise one or more data objects corresponding to information associated with a user (e.g. a user identifier, a name). Each concept node may comprise one or more data objects corresponding to information associated with a concept (e.g. a name, a description). Each edge between a pair of nodes may comprise one or more data objects corresponding to information associated with a relationship between users (or between a user and a concept, or between concepts) corresponding to the pair of nodes.

In particular embodiments, the social-networking system may comprise one or more computing devices (e.g. servers) hosting functionality directed to operation of the social-networking system. In particular embodiments, one or more of data stores 101 may be operably connected to the social-networking system's front end 120. A user of the social-networking system may access the social-networking system using a client device such as client device 122. In particular embodiments, front end 120 may interact with client device 122 through network cloud 121. For example, front end 120 may be implemented in software programs hosted by one or more computing devices of the social-networking system. Front end 120 may include web or HTTP server functionality, as well as other functionality, to allow users to access the social-networking system.

Client device 122 may be a desktop computer, laptop computer, tablet computer, personal digital assistant (PDA), in- or out-of-car navigation system, smart phone or other cellular or mobile phone, or mobile gaming device, among other suitable computing devices. Client device 122 may execute one or more client applications, such as a web browser (e.g. Microsoft Windows Internet Explorer, Mozilla Firefox, Apple Safari, Google Chrome, and Opera, etc.) or special-purpose client application (e.g. Facebook for iPhone, etc.), to access and view content over a computer network.

Network cloud 121 may represent a network or collection of networks (such as the Internet, a corporate intranet, a virtual private network, a local area network, a wireless local area network, a cellular network, a wide area network, a metropolitan area network, or a combination of two or more such networks) over which client devices 122 may access the social network system.

In particular embodiments, the social-networking system may store in data stores 101 data associated with applications and services provided by the social-networking system. For example, the social-networking system may store a user's post (e.g. a post identifier, a text string, and a time stamp) in data stores 101. The post may be represented by a particular node of a social graph, while the association between the post and a second user (e.g. the second user "likes" the post) may be represented by an edge connecting the particular node and a user node for the second user in the social graph. For another example, the social-networking system may store photos (or other media files) updated by a user in data stores 101. A photo may be represented by a particular node of a social graph, while a tag between the photo and a second user may be represented by an edge connecting the particular node and a user node for the second user in the social graph.

The social-networking system may also store links (or content) of web pages and applications in data stores 101. For example, the social-networking system may store information for a web page (e.g. an identifier, a name, a URL address) in data stores 101. The information for the web page may be represented by a particular node of a social graph, while the association between the web page and a second user (e.g. the second user "likes" the web page, or the second user "checks in" a place corresponding to the web page) may be represented by an edge connecting the particular node and a user node for the second user in the social graph. As another example, the social-networking system may store information for an application (e.g. an identifier, a name, a description, a URL link to the application) in data stores 101. The information for the application may be represented by a particular node of a social graph, while the association between the application and a second user (e.g. the second user "likes" the application, or the second user "subscribes" to the application) may be represented by an edge connecting the particular node and a user node for the second user in the social graph.

For the example social-networking system illustrated in FIG. 1, the amount of data (e.g. data for a social graph) stored in data stores 101 may be very large. For example, a social graph used by Facebook of Menlo Park, Calif. may have a number of nodes on the order of $10^8$, and a number of edges on the order of $10^{10}$. Typically, a large collection of data such as a large database may be divided into a number of partitions. Each partition may be hosted by separate servers or at separate physical locations. As the partitions may be distributed over a large number of servers (with each partition potentially duplicated at geographically diverse locations), the partitioning may improve performance and reliability in accessing the database. Ordinarily, a database may be partitioned by storing rows (or columns) of the database separately. A database may also be partitioned by using a hashing algorithm. A database may also be partitioned by some real-world segmentation of the data held by the database (e.g. customers in each time zone of the United States). Particular embodiments may partition storage of a collection of data based on object types. Particular embodiments may store data objects in a plurality of partitions, each partition holding data objects of a single object type. Particular embodiments may retrieve results of a search query by submitting the search query to a partition storing objects of the same object type as the search query's expected results. This disclosure contemplates any suitable partitioning (or a lack of partitioning) of storage of a collection of data for a social-networking system.

Figure 2:
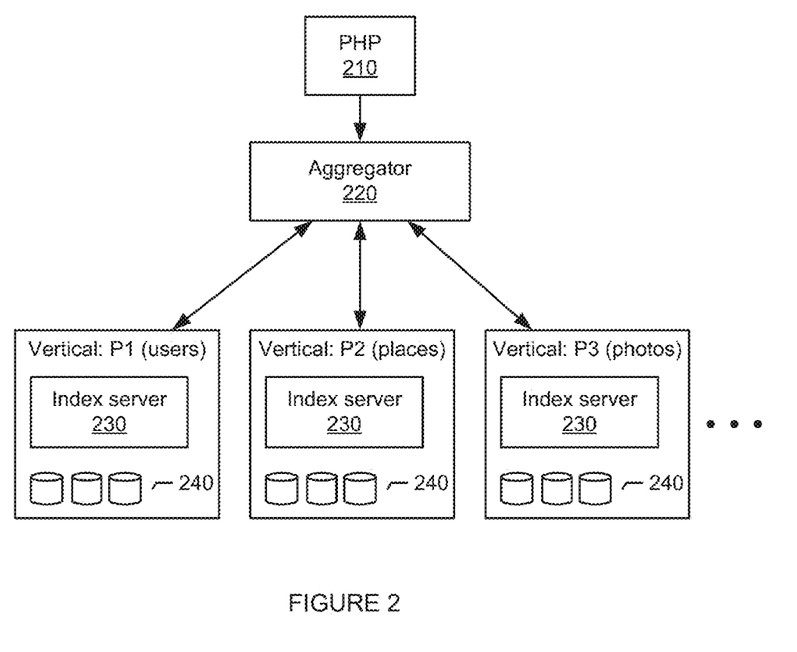
FIG. 2 illustrates an example of storing objects of a social-networking system.

FIG. 2 illustrates an example partitioning for storing objects of a social-networking system. In the example of FIG. 2, a plurality of data stores or verticals (e.g. P1, P2, P3, and so on) may store objects of a social networking system. In particular embodiments, each data store may be configured to store objects of a particular type of a plurality of object types in respective data storage devices 240. An object type may be: user, place or page, group, photo, post, web page, or application. Other examples of object types may be music, comment, event, message, offer (e.g. coupon), or review. In yet other embodiments, object types may be more specific versions of general object types; for example the object type "coffee shop" may be a more specific version of the object type "place." This disclosure contemplates any suitable object types for a social-networking system. For example, vertical P1 illustrated in FIG. 2 may store user objects; vertical P2 may store place objects; vertical P3 may store photo objects (or objects of other media types such as video or audio). That is, each data store may store objects of a single object type. In particular embodiments, objects stored in each data store or vertical may be indexed (e.g. for searching) by a search index. In particular embodiments, a search index contains all terms on which searches may be performed and a mapping from the terms to objects that may be organized in some manner. A search index (or multiple search indices) may be hosted by index server 230 comprising one or more computing devices (e.g. servers). In particular embodiments, each data store or vertical has a corresponding search index, and this search index may be hosted by an index server 230 for the respective data store or vertical. As the index for each partition (e.g. data store or vertical) of the database is smaller than an index for the overall database, the partitioning may improve performance in accessing the database. In yet other embodiments, the search index or indices may be hosted by a single index server 230 on a single device (e.g. server) or may be hosted by a centralized or shared index server 230 comprising multiple computing devices (e.g. servers).

In some embodiments, each object stored in a data store or vertical may correspond to a particular node of a social graph of the social-networking system. An edge connecting the particular node and another node may indicate a relationship between the object of the particular node and a user (or concept) corresponding to the other node. The search index or indices may be updated to include information regarding objects and relationships associated with the objects (i.e., edges in the social graph connecting to a node corresponding to each object) in each data store or vertical.

The social-networking system may rank a particular object by a number of edges (i.e., a number of known relationships) connecting to a node corresponding to the particular object in the social graph. For example, the social-networking system may rank a photo object by a number of "likes" associated with the photo object. For instance, a photo liked by 15 users may be ranked higher than another photo liked by 7 users. As another example, the social-networking system may also rank a photo object by a number of users tagged in the photo object. As yet another example, the social-networking system may rank a page object (corresponding to a web page) by a number of "likes" or may rank a place object (corresponding to a location) by a number of "check-ins" associated with the place object. In particular embodiments, the objects in a search index may be organized by a static rank; that is, the relative importance of each object may be specified independently from any particular search request, and this relative importance may be used to rank the objects in one or more search indices. This disclosure contemplates any suitable methods for ranking objects of the social-networking system.

Figure 3:
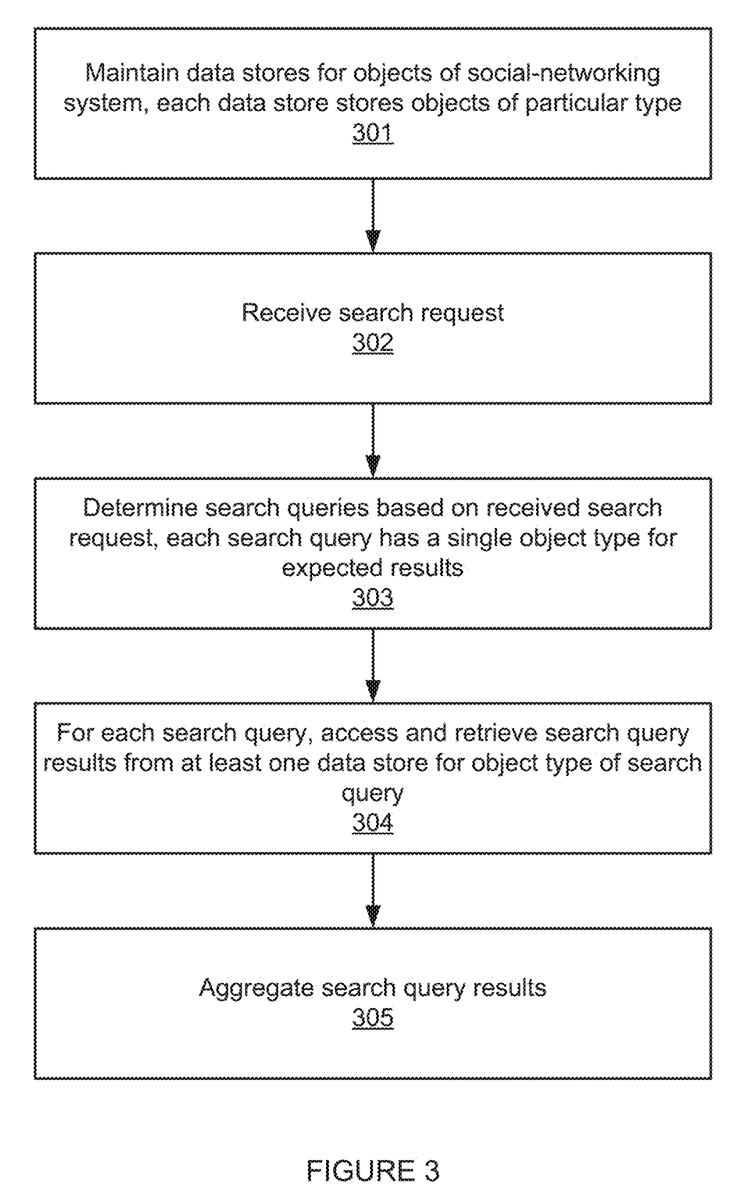
FIG. 3 illustrates an example method for searching objects.

FIG. 3 illustrates an example method for searching objects stored in the plurality of data stores illustrated in FIG. 2. The example method of FIG. 3 may be implemented by a server process hosted by one or more computing devices (e.g. servers) of the social-networking system. In particular embodiments, the server process may maintain the plurality of data stores (e.g. in data storage devices 240) for the social-networking system. The example method of FIG. 3 may also be implemented by an aggregator process 220 illustrated in FIG. 2. The aggregator process may be one or more computing processes (or programs) hosted by one or more computing devices (e.g. servers) of the social-networking system. Particular embodiments may maintain the plurality of data stores as illustrated in FIG. 2. Each of the data stores may be configured to store a single type of object indexed by a search index as described earlier. In particular embodiments, the aggregator process may receive a search request (step 302). For example, the aggregator process may receive a search request from a PHP (Hypertext Preprocessor) process 210 illustrated in FIG. 2. In particular embodiments, the search request may comprise a text string. The search request may be a structured or substantially unstructured text string submitted by a user via a PHP process. The search request may also be structured or a substantially unstructured text string received from another process of the social-networking system. For example, the search request can be "coffee" or "Starbucks Palo Alto." In particular embodiments, the search request may comprise one or more search terms. A search term may be a subset of the search request (e.g., a subset of a text string submitted by a user). For example, in the search request "Starbucks Palo Alto," a search term may be "Starbucks" and another search term may be "Palo." As another example, in the search request "coffee," the search request has one search term, "coffee."

In particular embodiments, the aggregator process may determine one or more search queries based on the received search request (step 303). In particular embodiments, each of the search queries may have a single object type for its expected results (i.e., a single result-type). In particular embodiments, the aggregator process may, for each of the search queries, access and retrieve search query results from at least one of the data stores, the at least one data store being configured to store objects of the object type of the search query (i.e., the result-type of the search query) (step 304). In particular embodiments, the aggregator process may aggregate search query results of the respective search queries (step 305). For example, the aggregator process may submit a search query to a particular vertical and access index server 230 of the vertical, causing index server 230 to return results for the search query.

Particular embodiments may repeat the steps of the method of FIG. 3, where appropriate. Moreover, although this disclosure describes and illustrates particular steps of the method of FIG. 3 as occurring in a particular order, this disclosure contemplates any suitable steps of the method of FIG. 3 occurring in any suitable order. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

As described earlier, particular embodiments may partition storage of objects of the social-networking system by object types. For example, as illustrated in FIG. 2, particular embodiments may store user objects in one partition (vertical P1 illustrated in FIG. 2), store place objects in another partition (vertical P2), store photo objects in a third partition (vertical P3), and so on. For example, as illustrated in FIG. 3, particular embodiments may convert a search request (e.g. a text string from a user that may comprise one or more search terms) to one or more search queries in that each search query has a single result-type (single object type for its expected results). Particular embodiments may submit each search query to a partition storing objects of the same type as the search query's result-type, and retrieve search results of the search query. Particular embodiments may aggregate search query results of the respective search queries for a final search result.

In particular embodiments, once a search query is generated, it may be used to retrieve search query results (e.g. objects) from one or more data stores 101 such that only the top N matching objects are retrieved. N may be chosen to enhance search quality. As an example, only the top N matching photo objects from a photo vertical or data store (P3) may be retrieved in response to a query for photos, and the top N photo objects may be determined by a static ranking of the photo objects in a search index corresponding to the photo vertical. Additionally, in particular embodiments, rather than returning the top N results directly to a user, these N results may go through another round of ranking based on the search request itself. As an example, if N is 100, the top 100 photo objects (as determined by a static ranking) may be ranked based on the search request, and the top 15 results may then be presented to a user. In yet other embodiments, the top results after both a static ranking and a dynamic ranking (e.g. a ranking based on the search request) may be sent to an aggregator for a final round of ranking, where results may be reordered, redundant results may be dropped, or any other type of results-processing may occur before presentation to a user.

In some cases, a user may enter a search request for an object such as a place but may desire more diversity in search results than simply the top N places determined by a static ranking of places. For example, a user may enter a search request for the place "Starbucks," but the user may not desire search results reflecting only the global top 100 Starbucks determined by a static ranking of Starbucks. In particular, the user may desire to see search results that reflect the user's present location (e.g. determined by a user's mobile device communicating location information to the social-networking system), like nearby Starbucks locations that may not be in the global top 100 Starbucks. As another example, the user may desire to see search results that reflect the user's relationships within a social graph, like Starbucks locations that the user's friends have visited that may not be in the global top 100 Starbucks.

In particular embodiments, a search query may include one or more search terms of the original search request. As an example, in response to a search request for "Starbucks Palo Alto," the social-networking system (e.g., aggregator 220) may determine a search query including some or all of the search terms "Starbucks," "Palo," and "Alto". Additionally, in particular embodiments, a search query may include operators (e.g., Boolean operators like AND or OR) that may operate on arguments including keywords (e.g., search terms) or logical expressions comprising operators and keywords. This disclosure contemplates any type of search query including any suitable keywords, connectors, operators, limiters, or expressions used to conduct searches of data sources, as appropriate. As another example, if a user enters the search request with the single search term "coffee," in order to search for a coffee shop, the social-networking system may translate this search request to a search query, such as, for example:

(TERM category:coffee).

This query assumes that an index for coffee shops contains the term "category:coffee". This query would result in the global top N coffee shops being returned to the user. In particular embodiments, the social-networking system may take into account physical proximity when translating the search request to a search query by adding implicit search constraints. As an example, the world may be divided into multiple geographic "tiles" of varying sizes (e.g. tiles of size 3 square km, 50 square km, and 200 square km), with the potential for a tile to lie partially or entirely within another tile. Each tile may have a unique name, and this unique name may be added to the index of every object (e.g. user or place) that lies within the tile. Thus, if a user currently located within the Menlo Park tile area enters the search request "coffee," the social-networking system may translate this search request to the search query:

(AND category:coffee tile:menlo_park_tile).

This query, using the standard AND operator, would return the top N coffee shops that are also located in the Menlo Park tile. It may be the case, however, that the Menlo Park tile has no coffee shops (e.g. no objects matching the "category:coffee" part of the query), or less than N coffee shops.

In particular embodiments, the use of search operators in search queries may create diversity in search results. In one embodiment, a "weak and" operator (WAND) may be defined. The WAND operator allows one or more of its arguments (e.g., keywords or logical expressions comprising operators and keywords) within the search query to be absent a specified number of times or percentage of time. Thus, if a user currently located within the Menlo Park tile area enters the search request "coffee," the social-networking system may translate this search request to the search query:

(WAND category:coffee tile:menlo_park_tile: optional-weight 0.3).

In this example, instead of requiring that search results always match both the "category:coffee" and "tile:menlo_park_tile" portions of the search query, the Menlo Park portion of the query is optionalized with a weight of 0.3 In this case, this means that 30% of the search results must match the "tile:menlo_park_tile" term, and the remaining 70% of the search results may omit that term. Thus, if N is 100, then 30 coffee shop results must be located within the Menlo Park tile, and 70 coffee shop results may come from anywhere (e.g. from the global top 100 coffee shops determined by a static ranking of coffee shops). In particular embodiments, the term "category:coffee" may also be assigned an optional weight, such that the search results need not even always match the term "coffee" and some results may be chosen by the social-networking system to be any object (e.g. place).

In particular embodiments, the use of multiple location tiles or weights may be used by a social-networking system. As an example, if a user currently located within the Menlo Park tile area (which is fully within the San Mateo County tile area, which itself is fully within the Bay Area Regional tile area) enters the search request "coffee," the social-networking system may translate this search request to the search query:

(WAND category:coffee
tile:menlo_park_tile: optional-weight 0.6
tile:san_mateo_county_tile: optional-weight 0.8
tile:bay_area_regional_tile: optional-weight 0.9).

This query specifies that all of the results must be coffee shops, that 60% of the coffee shop results must be within the Menlo Park tile area, 80% must be within the San Mateo County tile area (whether within or outside the Menlo Park tile), and 90% must be within the Bay Area tile area (whether within or outside the San Mateo County or Menlo Park tiles). In this query, 10% of results may be coffee shops located anywhere. The social-networking system may first search one or more verticals or data stores for objects that do not match optional constraints, and then proceed to searching for objects that do match optional constraints until all constraints on the search results are met (or are determined to be unfulfillable). As an example, if a user enters a search request for "Eiffel tower" and is located in the Paris, France tile (and this tile has an optional weight of 0.7), then the social-networking system may first focus on finding the top 30% of global results that match "Eiffel" and "tower" but do not match the tile location portion of the search query, and then proceed (once those 30% of results are found or it is determined that not enough results exist) to searching for the remaining 70% of results that match "Eiffel" and "tower" and that are also located in the Paris tile.

In particular embodiments, the social-networking system may take into account social graph information when translating the search request to a search query by adding implicit search constraints. As an example, a user may have friends Tom, Dick, and Harry. The user may be represented in a social graph of a social-networking system by a node. The node of the user may be connected via edges to nodes representing Tom, Dick, and Harry, also users of the social-networking system. This information from the graph may be used to diversify search results using the WAND operator. As an example, if the user searches for "coffee," the social-networking system may translate the search request to the search query:
(WAND category:coffee
(OR checkin:tom
checkin: dick
checkin: harry) optional-weight 0.2).

In this case, the WAND operator is used in conjunction with the standard OR operator. This query specifies that at least 20% of coffee shop results must contain "check-in" information indicating that any of Tom, Dick, or Harry have checked-in to the shop. The remaining 80% of search results need only be coffee shops and need not match any social graph information. As another example, the user may search for another user named Mark. If the user searches for "Mark," the social-networking system may translate the search request to the search query:
(WAND Mark
(OR friend-of: tom
friend-of: dick
friend-of: harry) optional-weight 0.7).

In this case, the WAND operator is again used in conjunction with the standard OR operator. This query specifies that at least 70% of Marks returned must be friends of one of Tom, Dick, or Harry. The remaining 30% of search results need only be users named Mark and need not match any further social graph information. Finally, as another example, if the user searches for "Mark," while located in the Menlo Park tile, the social-networking system may translate the search request to the search query:
(WAND Mark
(OR friend-of: tom
friend-of: dick
friend-of: harry) optional-weight 0.7
tile:menlo_park_tile: optional-weight 0.2).

In this case, the WAND operator is again used in conjunction with the standard OR operator. This query specifies that at least 70% of Marks returned must be friends of one of Tom, Dick, or Harry, and at least 20% of Marks returned must be located in the Menlo Park tile. In this case, at least 10% and up to 30% of search results need only be users named Mark and need not match any further locality or social graph information.

In another embodiment, a "strong or" operator (SOR) may be defined. The SOR operator requires each of its operands to be present a specified number or specified percentage of the time. As an example without the use of SOR, if a user searches for "coffee OR tea," the social-networking system would return a multitude of results, with each result matching either "coffee" or "tea" (and perhaps both). However, in the case that the top 100 global shops (determined by a static ranking, for example) are coffee shops, and if the user is only returned 100 results, the user may receive results only for coffee shops and no tea shops. The SOR operator may increase diversity in results. As an example, if a user searches for "coffee OR tea," the social-networking system may translate the search request to the query:
(SOR category:coffee optional-weight 0.4
category: tea optional-weight 0.3).

In this case, 40% of the results must be coffee shops, and 30% of the results must be tea shops, with the remainder of the search results meeting either the coffee or tea shop criteria (or both).

As another example, the SOR and WAND operators may be used together. This may allow for even further diversity in search results. As an example, if a user currently located in Menlo Park and whose friends are Tom, Dick, and Harry searches for "coffee," the social-networking system may translate the search request into the search query:
[SOR category: coffee
(WAND tile:menlo_park_tile: optional-weight 0.3
tile:san_mateo_county_tile: optional-weight 0.5)
optional-weight 0.9
(OR checkin:tom
checkin:dick
checkin:harry) optional-weight 0.4].

In this case, all results must be coffee shops (because there is no weight attached to the "category:coffee" argument, it must be present in all results). 90% of the results must match the WAND operand of the SOR operator (meaning that of these results, 30% must be coffee shops in Menlo Park, and 50% must be coffee shops in San Mateo County, with the rest being coffee shops potentially in any location), 40% of the results must match the OR operand of the SOR operator (e.g. that of these results, at least one of Tom, Dick, or Harry must have checked-in to the coffee shop), and the remainder of results must be coffee shops and match at least the locality or the social-graph operands of the SOR operator. In this manner, results matching both locality constraints and social-graph-related constraints may reach the user.

This disclosure contemplates that, in particular embodiments, the social-networking system may determine what, if any, additional search constraints may be added in translating a search request to a search query, and that in other embodiments, a user of the social-networking system may determine what, if any, additional search constraints may be added. Additionally, while this disclosure discloses particular syntax for search queries, any suitable syntax may be used to perform search queries using the operators described herein.

Figure 4:
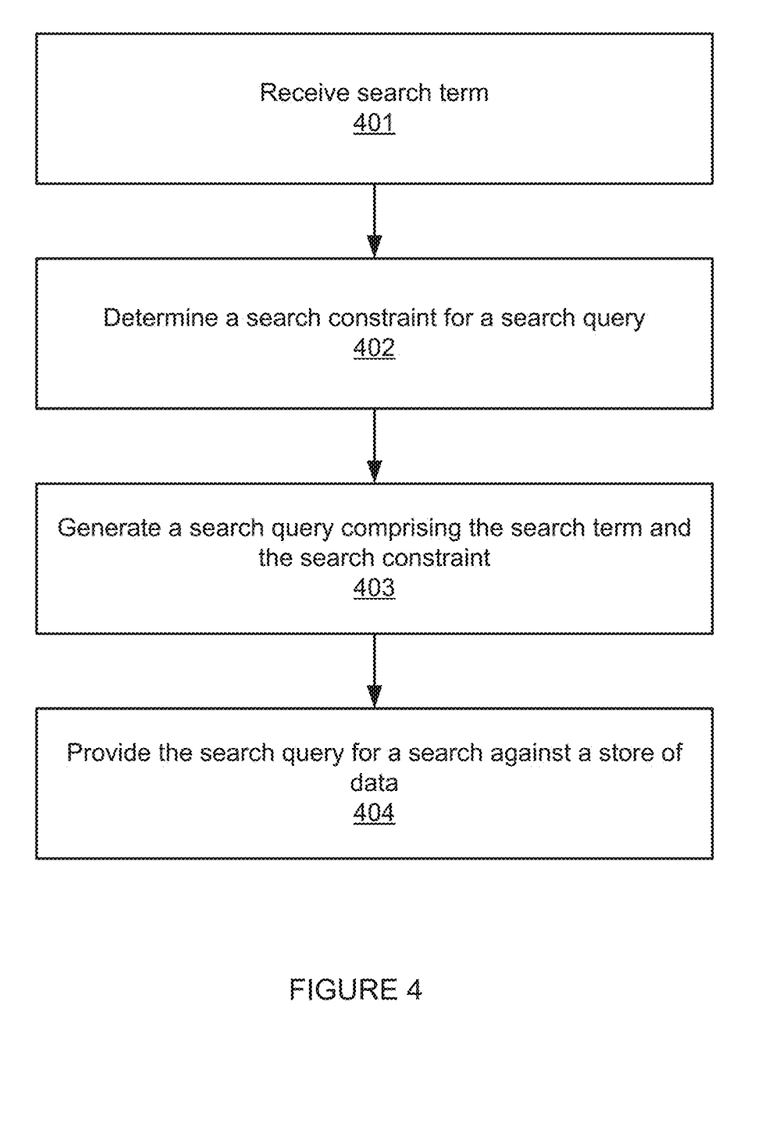
FIG. 4 illustrates an example method for searching in a social-networking system.

FIG. 4 illustrates an example method for searching in a social-networking system. At step 401, a search term is received. In particular embodiments, the search term is part or all of a search request from a user of the social-networking system, and the search term is received by a server process or an aggregator of the social-networking system. At step 402, a search constraint is determined for a search query. In particular embodiments, the search constraint may be an implicit search constraint that is chosen by the social-networking system, and in other embodiments, the search constraint may be a search constraint chosen by a user of the social-networking system. The search constraint may, without limitation, include locality constraints or constraints based on information from a social graph. At step 403, a search query comprising the search term and the search constraint is generated. In particular embodiments, the search query requires that at least a first number (or percentage) of search results returned in response to the search query match both the search term and the search constraint, while permitting at least a second number of the search results to match only the search term (e.g. as in the case of using the WAND operator). In particular embodiments, the search query requires that at least a first number (or percentage) of search results returned in response to the search query match the search term, and that at least a second number (or percentage) of search results match the search constraint, with the remainder matching either the search term or the search constraint (e.g. as in the case of using the SOR operator). At step 404, the search query is provided for a search against a store of data. In particular embodiments, the search query may be provided for a search using search indices for one or more data stores or verticals of a social-networking system.

Figure 5:
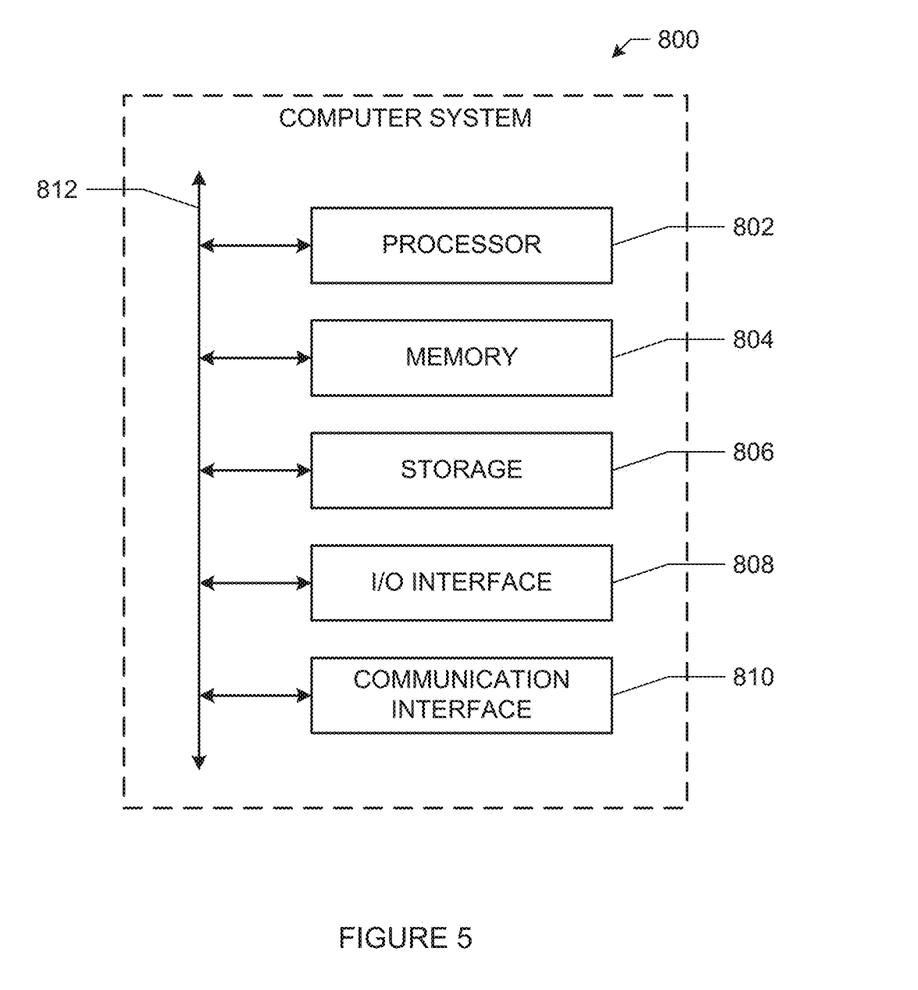
FIG. 5 illustrates an example computer system.

FIG. 5 illustrates an example computer system 800, which may be used with some embodiments of the present invention. This disclosure contemplates any suitable number of computer systems 800. This disclosure contemplates computer system 800 taking any suitable physical form. As example and not by way of limitation, computer system 800 may be an embedded computer system, a system-on-chip (SOC), a desktop computer system, a mobile computer system, a game console, a mainframe, a mesh of computer systems, a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. In particular embodiments, memory 804 includes main memory for storing instructions for processor 802 to execute or data for processor 802 to operate on. As an example and not by way of limitation, computer system 800 may load instructions from storage 806 to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM).

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (e.g. a BLUETOOTH WPAN), a WI-FI network (e.g. a 802.11a/b/g/n WI-FI network), a WI-MAX network, a cellular network (e.g. a Global System for Mobile Communications (GSM) network, a Long Term Evolution (LTE) network), or other suitable wireless network or a combination of two or more of these.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 812 may include one or more buses 812, where appropriate.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a computing system:
receiving, from a client device of a first user of an online social network, a search request comprising one or more terms inputted by the first user;
generating, by the computing system, a plurality of queries based on the search request, wherein each query is associated with a particular object type of a plurality of object types and an associated weight;
searching a plurality of verticals of the online social network corresponding to the plurality of queries, respectively, to identify from each vertical one or more objects matching the respective query, each vertical storing objects of the particular object type associated with the respective query, wherein:
the objects stored in each vertical are ranked; and
identifying the one or more objects from each vertical is based on the respective rankings of the one or more objects;
aggregating the identified objects across the verticals, the number of identified objects aggregated from each vertical being proportional to the weight associated with the query corresponding to the vertical; and
sending, to the client device of the first user, a search-results page responsive to the search request, the search-results page comprising a plurality of search results of a plurality of object types, wherein the plurality of search results are determined based on the aggregation, wherein, for each query of the plurality of queries, at least one search result corresponds to an identified object of the particular object type associated with the query, and wherein, for each vertical of the plurality of verticals, at least one search result corresponds to an object stored by the vertical.

2. The method of claim 1, wherein an object type comprises one of a user, place, group, photo, post, page, or application.

3. The method of claim 1 further comprising, for each vertical, ranking the objects stored in the vertical based on a relative importance of the objects.

4. The method of claim 3, wherein the online social network comprises a social graph comprising a plurality of nodes and a plurality of edges connecting the nodes, each of the edges between two of the nodes representing a single degree of separation between them, the nodes comprising:
a first node corresponding to the first user of the online social network;
a plurality of second nodes respectively corresponding to a plurality of objects, each object being stored in a particular vertical associated with the object type of the object.

5. The method of claim 4, wherein, for each object, the ranking is based on a number of edges connecting a second node corresponding to the object to another node in the social graph.

6. The method of claim 1, further comprising, dynamically ranking, for each vertical, the identified objects from the vertical, wherein the objects are dynamically ranked based on the search request.

7. The method of claim 6, wherein the search-results page presents the search results ordered based on the rankings of their corresponding identified objects.

8. The method of claim 1, wherein each vertical is indexed by a respective search index.

9. The method of claim 8, wherein the searching further comprises executing each query on the respective search index of the vertical storing objects of the particular object type associated with the query to identify one or more objects matching the query.

10. The method of claim 1, wherein each query comprises some or all of the terms of the search request.

11. The method of claim 1, wherein at least one query comprises a logical operator, at least one search term of the search request, and a search constraint.

12. The method of claim 11, wherein the search constraint is determined for the at least one term of the at least one query based on social-networking information of the first user.

13. The method of claim 11, wherein the at least one query permits at least a portion of the identified objects for the at least one query to match only the at least one term.

14. The method of claim 1, further comprising, for each vertical, statically ranking the objects stored in the vertical.

15. The method of claim 14, wherein, for each vertical, the one or more objects matching the query are identified based on the static ranking.

16. The method of claim 1, wherein the weight associated with each query is specified as a percentage, fraction, decimal, ratio, whole number, or any combination thereof.

17. One or more computer-readable non-transitory storage media in one or more computing systems, the media embodying logic that is operable when executed to:
receive, from a client device of a first user of an online social network, a search request comprising one or more terms inputted by the first user;
generate, by the one or more computing systems, a plurality of queries based on the search request, wherein each query is associated with a particular object type of a plurality of object types and an associated weight;
search a plurality of verticals the online social network corresponding to the plurality of queries, respectively, to identify from each vertical one or more objects matching the respective query, each vertical storing objects of the particular object type associated with the respective query, wherein:
the objects stored in each vertical are ranked; and
identifying the one or more objects from each vertical is based on the respective rankings of the one or more objects;
aggregate the identified objects across the verticals, the number of identified objects aggregated from each vertical being proportional to the weight associated with the query corresponding to the vertical; and
send, to the client device of the first user, a search-results page responsive to the search request, the search-results page comprising a plurality of search results of a plurality of object types, wherein the plurality of search results are determined based on the aggregation, wherein, for each query of the plurality of queries, at least one search result corresponds to an identified object of the particular object type associated with the query, and wherein, for each vertical of the plurality of verticals, at least one search result corresponds to an object stored by the vertical.

18. A system comprising: one or more processors; and a non-transitory memory coupled to the processors comprising instructions executable by the processors, the processors operable when executing the instructions to:
receive, from a client device of a first user of an online social network, a search request comprising one or more terms inputted by the first user;
generate, by the system, a plurality of queries based on the search request, wherein each query is associated with a particular object type of a plurality of object types and an associated weight;
search a plurality of verticals of the online social network corresponding to the plurality of queries, respectively, to identify from each vertical one or more objects matching the respective query, each vertical storing objects of the particular object type associated with the respective query, wherein:
the objects stored in each vertical are ranked; and
identifying the one or more objects from each vertical is based on the respective rankings of the one or more objects;
aggregate the identified objects across the verticals, the number of identified objects aggregated from each vertical being proportional to the weight associated with the query corresponding to the vertical; and
send, to the client device of the first user, a search-results page responsive to the search request, the search-results page comprising a plurality of search results of a plurality of object types, wherein the plurality of search results are determined based on the aggregation, wherein, for each query of the plurality of queries, at least one search result corresponds to an identified object of the particular object type associated with the query, and wherein, for each vertical of the plurality of verticals, at least one search result corresponds to an object stored by the vertical.

* * * * *